US008406833B2

(12) United States Patent
Roth et al.

(10) Patent No.: US 8,406,833 B2
(45) Date of Patent: Mar. 26, 2013

(54) CRYOSTAT HAVING A MAGNET COIL SYSTEM, WHICH COMPRISES AN LTS SECTION AND A HEATABLE HTS SECTION

(75) Inventors: Gerhard Roth, Rheinstetten (DE); Axel Lausch, Koenigsback-Stein (DE)

(73) Assignee: Bruker Biospin GmbH, Rheinstetten (DE)

( * ) Notice: Subject to any disclaimer, the term of this patent is extended or adjusted under 35 U.S.C. 154(b) by 977 days.

(21) Appl. No.: 12/225,187

(22) PCT Filed: Mar. 7, 2007

(86) PCT No.: PCT/EP2007/001927

§ 371 (c)(1), (2), (4) Date: Sep. 16, 2008

(87) PCT Pub. No.: WO2007/107241

PCT Pub. Date: Sep. 27, 2007

(65) Prior Publication Data

US 2009/0275477 A1 Nov. 5, 2009

(30) Foreign Application Priority Data

Mar. 18, 2006 (DE) ........................ 10 2006 012 506

(51) Int. Cl.
*H01F 6/04* (2006.01)
*H01F 6/06* (2006.01)
*G01V 3/00* (2006.01)

(52) U.S. Cl. ........ 505/163; 505/162; 505/211; 505/844; 505/879; 505/892; 335/216; 335/296; 335/301; 324/318; 324/320; 62/6; 62/51.1

(58) Field of Classification Search .................. 505/163, 505/211, 230, 433, 705, 844, 879, 885, 892, 505/951; 335/216–217, 296–301; 324/318–320; 62/51.1

See application file for complete search history.

(56) References Cited

U.S. PATENT DOCUMENTS

| | | | | |
|---|---|---|---|---|
| 4,924,198 A * | 5/1990 | Laskaris | ....................... | 505/211 |
| 5,150,578 A * | 9/1992 | Oota et al. | ...................... | 62/47.1 |

(Continued)

FOREIGN PATENT DOCUMENTS

| | | |
|---|---|---|
| DE | 10 2004 007340 | 9/2005 |
| EP | 0 416 959 | 3/1991 |

(Continued)

OTHER PUBLICATIONS

Kiyoshi et al, "Superconducting Inserts in High-Field Solenoids", IEEE Transactions on Applied Superconductivity, US, vol. 12, No. 1, Mar. 2002, pp. 470-475.*

*Primary Examiner* — Stanley Silverman
*Assistant Examiner* — Kallambella Vijayakumar
(74) *Attorney, Agent, or Firm* — Paul Vincent

(57) ABSTRACT

A cryostat (1) with a magnet coil system including superconductors for the production of a magnet field $B_0$ in a measuring volume (3) has a plurality of radically nested solenoid-shaped coil sections (4, 5, 6) and which are electrically connected in series, at least one of which being an LTS section (5, 6) with a conventional low temperature superconductor (LTS) and at least one of which being an HTS section (4) including a high temperature superconductor (HTS), wherein the magnet coil system is located in a helium tank (9) of the cryostat (1) along with liquid helium at a helium temperature $T_L$<4 K. The apparatus is characterized in that heating means are provided which always keep the HTS at an increased temperature $T_H > T_L$ and $T_H > 2.2$ K. The cryostat in accordance with the invention can maintain the HTS section over a long period of time in a reliable manner.

20 Claims, 4 Drawing Sheets

U.S. PATENT DOCUMENTS

| | | | | |
|---|---|---|---|---|
| 6,600,398 | B2 | 7/2003 | Roth | |
| 2002/0000807 | A1 * | 1/2002 | Nakamura et al. ............ | 324/315 |
| 2006/0066429 | A1 * | 3/2006 | Kasten .......................... | 335/296 |

FOREIGN PATENT DOCUMENTS

| | | |
|---|---|---|
| WO | WO 03/044813 | 5/2003 |

* cited by examiner

CRYOSTAT HAVING A MAGNET COIL SYSTEM, WHICH COMPRISES AN LTS SECTION AND A HEATABLE HTS SECTION

This application is the national stage of PCT/EP2007/001927 filed on Mar. 7, 2007 and also claims Paris Convention priority to DE 10 2006 012 506.1 filed Mar. 18, 2006.

BACKGROUND OF THE INVENTION

The invention concerns a cryostat having a magnetic coil system including superconducting materials for generation of a magnetic field $B_0$ within a measurement volume, the magnet system having a plurality of radially nested solenoid-shaped coil sections connected in series at least one of which is an LTS section of a conventional low temperature superconductor (LTS) and with at least one HTS section of a high temperature superconductor (HTS), wherein the magnet coil system is located in a helium tank of the cryostat having liquid helium at a helium temperature $T_L$<4 K.

Cryostats of this kind are e.g. disclosed in DE 10 2004 007 340 A1.

By way of example, nuclear magnetic resonance systems, in particular spectrometers, require very strong, homogenous and stable magnetic fields. The stronger the magnetic field, the better the signal to noise ratio as well as the spectral resolution of the NMR measurement.

Superconducting magnet coil systems are used to produce strong magnetic fields. Magnetic coil systems having solenoid-shaped coil sections are widely used which are nested within each other and operated in series. Superconductors can carry electrical current without losses. The superconducting condition is established below the material-dependent transition temperature. Conventional low temperature superconductors (LTS) are normally utilized for the superconducting material. These metallic alloys, such as NbTi and $Nb_3S$, are relatively easy to process and are reliable in application. An LTS coil-portion conductor usually comprises a normally conducting metallic matrix (copper) in which superconducting filaments are embedded and which, during normal operation, completely carry the current. In the case of NbTi, these are usually several tens or hundreds of filaments; in the case of $Nb_3Sn$, the filament number could be more than one hundred thousand. Although the internal construction of the conductor is actually somewhat more complex, this is irrelevant within the present context.

The coil sections are cooled with liquid helium within a cryostat in order to cool the superconducting portions below the transition temperature. The superconducting coil sections are thereby at least partially immersed in the liquid helium.

In order to further increase the magnetic field strength of the magnetic coil system it is desirable to also utilize a high temperature superconductor (HTS). For a given temperature, conductors, which include HTS, can carry much more current and thereby achieve higher magnetic field strengths than those with LTS. HTS materials are thereby appropriate for use in the inner most coil sections of a magnetic coil system.

HTS or ceramic superconductors are currently primarily made from bismuth conductors with HTS filaments within a silver matrix. The conductors are usually stripe or band-shaped.

Coil sections made from HTS have turned out to be unreliable and susceptible to short lifetimes, particularly in undercooled helium. Investigation of defective HTS portions has shown that the HTS material is split open, thereby destroying the current carrying capability of the HTS conductor. This effect, which is also known in other context, is occasionally referred to as “ballooning”.

It is accordingly the purpose of the present invention to present a cryostat in which HTS coil portions enjoy a long lifetime and can be utilized in a reliable manner, in particular, without ballooning.

SUMMARY OF THE INVENTION

This purpose is achieved by a cryostat of the above-mentioned kind in that a heating means is provided which always keeps the HTS material at a temperature $T_H$>$T_L$ and $T_H$>2.2 K.

In accordance with the present invention, it has been discovered that the ballooning is caused by superfluid helium, which expands or evaporates within the HTS material. As is well known, helium liquefies at normal pressure below approximately 4.2 K. However, helium also has a phase transition at a temperature of 2.2 K (λ point). Below the λ point, liquid helium becomes superfluid, i.e. the helium flows without friction and has infinitely high conductivity. The first characteristic is responsible for the fact that it can flow into the smallest of gaps, in particular, into the hollow regions within a ceramic HTS, despite jacketing within a matrix. A sealing of the ceramic material is to no avail. In the event of a subsequent heating above the λ point, the helium remains trapped in the HTS. The warming causes expansion of the trapped helium, in particular, if the heating is sufficient to evaporate the helium. As a result thereof, substantial pressure is built up within the HTS. Since HTS is a ceramic material and therefore brittle, the HTS ruptures locally in response to the pressure, thereby resulting in degradation of the conductor.

This can be prevented in the cryostat in accordance with the invention. The HTS is thereby held by means of a heater at a certain temperature at which superfluid helium cannot occur. In this manner, one guarantees that superfluid helium does not penetrate into the HTS and no “ballooning” can occur.

It should be noted that the temperature $T_L$ of the largest portion of the liquid helium in the helium tank of the cryostat can, in accordance with the invention, be present at a temperature which is equal to or less than the λ point temperature of 2.2 K. It is only necessary for the HTS to be locally subjected to a sufficient degree of warmth. A temperature of $T_L$ of 2.2 K or less is even advantageous for particularly stable operation of the LTS section, in particular to minimize mechanical deformations due to temperature differences. However, most importantly, a temperature $T_L$ of less than 2.2 K increases the current carrying capacity as well as the critical magnetic field strength of the associated cooled LTS sections.

In a preferred embodiment of the cryostat in accordance with the invention, the heating means always keep the HTS above an increased temperature $T_H$>2.5 K. Even above the λ point of 2.2 K, superfluid helium phases can briefly occur. With this embodiment, sufficient buffer with regards to such fluctuations is established to better protect the HTS.

In a particularly preferred embodiment, the HTS section is the radially inner section. The greatest magnetic field strengths occur at this location and the expensive and difficult HTS is most effectively utilized at this location. Moreover, this configuration simplifies localized cooling of the HTS section.

In a further particularly preferred embodiment, the cryostat has a room temperature bore, surrounded by the magnet coil system, in which the measurement volume is located. The room temperature bore facilitates simple placement of the sample in space or with variable temperatures within the measurement volume.

In a preferred embodiment of the invention, the heating means is established by means of thermal contact between the inner most section and the wall of the helium tank facing the room temperature bore, wherein the contact to this wall passes absorbed radiative heat. This passive heating of the HTS section is particularly useful, since it provides sufficient introduction of heat into the HTS section through adjustability of the temperature of the radiation shield by construction thereof as well as via the mechanical coupling to the wall of the helium tank. Moreover, convection of the helium tank about the HTS section is easily prevented. In particular, the passive heating of the HTS is insensitive to power losses.

In a further advantageous embodiment, the heating means is established by means of thermal contact between the HTS section and through the wall of the helium tank to a radiative shield, wherein the radiative shield is located at a temperature of $T_S>T_L$, in particular, wherein $T_S$ is approximately 40 K. This heating is passive and therefore saves energy. In particular, it protects the HTS, even in the event of power loss.

In a particular preferred embodiment, the heating means is an electrical heater. An electrical heater is easy to control and even permits precise temperature control of the HTS section outside of the normal operation conditions, in particular during filling or emptying of the helium tank or in the case of a quench.

In a particular preferred embodiment of the cryostat in accordance with the invention, the HTS section and also the thermal contacts have a jacket for thermal isolation with respect to the surrounding helium. This embodiment reduces the cooling power, which is required for the liquid helium in the cryostat compensate for the heat input of the heating means. Moreover, the HTS is additionally protected mechanically from the superfluid helium.

In a further improvement of this embodiment, the jacket also extends to superconducting leads for the HTS section, at least to the extent that these leads contain HTS. The joints are therefore also protected from penetration by superfluid helium.

In a further preferred embodiment of the invention, the jacketing is made from plastic, in particular, from a multi-layered epoxy resin.

In a particular preferred embodiment of the invention, the magnetic field produced by the magnet coil system in the measurement volume $B_0>20$ T, in particular >23 T. These strong magnetic fields can easily be achieved with the HTS section and the cryostat in accordance with the invention. In contrast thereto, conventional magnet systems that only have LTS-based sections already reach the theoretical limit at these field strengths, having a critical current density which approaches 0.

In a further preferred embodiment, the coil sections of the magnetic coil system are superconducting short-circuited (persistent current mode) during operation. In this manner, the necessary stability for e.g. NMR and ICR (ion cyclotron resonance) is achieved.

In a further preferred embodiment, the magnetic coil system has a magnetic field $B_0$ homogeneity in the measurement volume and a time stability for the magnetic field $B_0$ that satisfy the requirements for high resolution NMR spectroscopy, which requires a special configuration of the magnet coil system and the cryostat, as is known in the art for LTS systems per se.

In an additional preferred embodiment of the cryostat in accordance with the invention, the helium tank has means to minimize convection of helium about the HTS section. The means are e.g. mechanical barriers disposed on a surface of the HTS section or proximate thereto to prevent or curtail the flow of helium on the surface of the HTS section or on the surfaces of components which are coupled thermally to the HTS section. The reduced convection reduces the flow of heat into the liquid helium caused by the heating means and also thereby reduces the cooling power of the liquid helium on the HTS section. This makes the cryostat more economical and more stable.

Further advantages of the invention can be derived from the description of the drawings. The above-mentioned features and those to be discussed below can be utilized in accordance with the invention individually or collectively in arbitrary combination. The embodiments shown and described are not to be considered exhaustive enumeration, rather have exemplary character only for illustrating the invention.

The invention is represented in the drawing and is further explained with reference to embodiments.

DESCRIPTION OF THE PREFERRED EMBODIMENT

Figure 1:
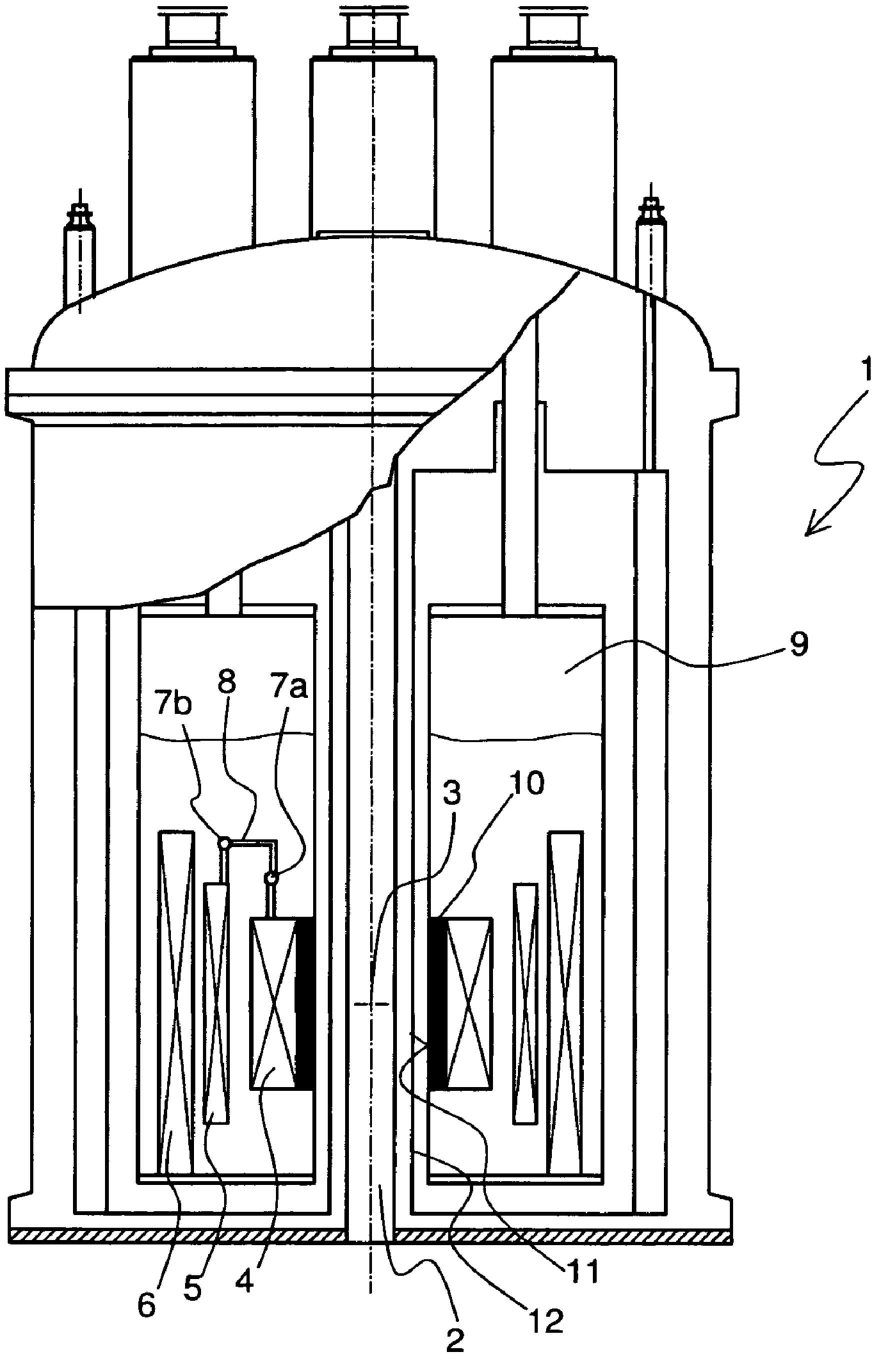
FIG. 1 is a schematic representation of a first embodiment of a cryostat in accordance with the invention with thermal contact of the HTS section to the wall of the helium tank, which is facing the room temperature bore.

FIG. 1 schematically shows a first embodiment of a cryostat 1 in accordance with the invention. The cryostat 1 has a room temperature bore 2 in which an investigational volume 3 for a sample is provided. The investigational volume 3 is located in the center of a magnetic coil system, which constitutes three solenoid-shaped coil section 4, 5, 6. The magnet coil system produces a homogeneous magnetic field $B_0$ in the investigational volume 3. The radially innermost coil section 4 has a wounding made from high temperature superconductor (HTS). The middle coil section 5 is wound with $Nb_3Sn$ wire and the outer most coil section 6 is wound with NbTi wire. The coil sections 5, 6 therefore represent low temperature superconductor (LTS) coil sections. The coil sections 4, 5, 6 are electrically connected to each other in series, as is shown in an exemplary fashion by means of superconducting joints 7*a* and 7*b*. At joint 7*a*, the high HTS material of the HTS coil section 4 is connected to an adaptor section 8 made from NbTi. At joint 7*b*, the adaptor member 8 is connected to the $Nb_3Sn$ wire of the LTS section 5. The coil sections 4, 5, 6 are located within a helium tank 9 which is substantially filled with liquid helium. The liquid helium in the helium tank 9 has a temperature $T_L$ of at least 4 K, by way of example, of approximately 2.0 K. The helium in the helium tank 9 is continuously cooled by means of a cooling device (not shown) in order to compensate for heat input from the outside and to keep $T_L$ constant (see e.g. U.S. Pat. No. 5,220,800). Alternative to the configuration in accordance with FIG. 1, the helium tank (such as in U.S. Pat. No. 5,220,800) can have two individual chambers which are separated by a thermal barrier and which can be located at temperatures of approximately 2 K and 4 K respectively, with the magnet coil system being located in the 2 K chamber.

The LTS coil sections 5, 6 also have the temperature $T_L$ within the helium bath. This is, however, not the case for the HTS coil section 4. This section has a thermal contact 10 which connects the HTS section 4 with a wall 11 of the helium tank 9 which is facing the room temperature bore 2 (and the measuring volume 3) in a manner which conducts heat. Heat that is incident on the wall 11 therefore causes a heat input into the HTS section 4 by means of the thermal contact 10. This heat radiation can, e.g. be given off by the radiation shield 12 which surrounds the helium tank 9. The radiation shield 12, in particular, receives heat radiation from the wall of the room temperature bore 2. The radiation shield 12 has a temperature of approximately 40 K.

An equilibrium is established in the HTS section 4 between the heat input by means of the thermal contact 10 and the cooling of the surrounding liquid helium resulting in the temperature $T_H$ that is larger than $T_L$ and in accordance with the invention, also larger than the temperature of the λ point in $^4$He of approximately 2.2 K. By way of example, $T_H$ can be approximately 3.0 K. This value for $T_H$ is sufficient to prevent penetration of superfluid helium into the HTS section and into the HTS material itself, i.e. helium remains in the vicinity of the surface of the HTS section 4 in a normal liquid condition and does not deeply penetrate. Since both the LTS 5, 6 and HTS 4 sections are immersed in a liquid helium bath, the temperature of those sections cannot generally exceed 4.2 K.

Figure 2:
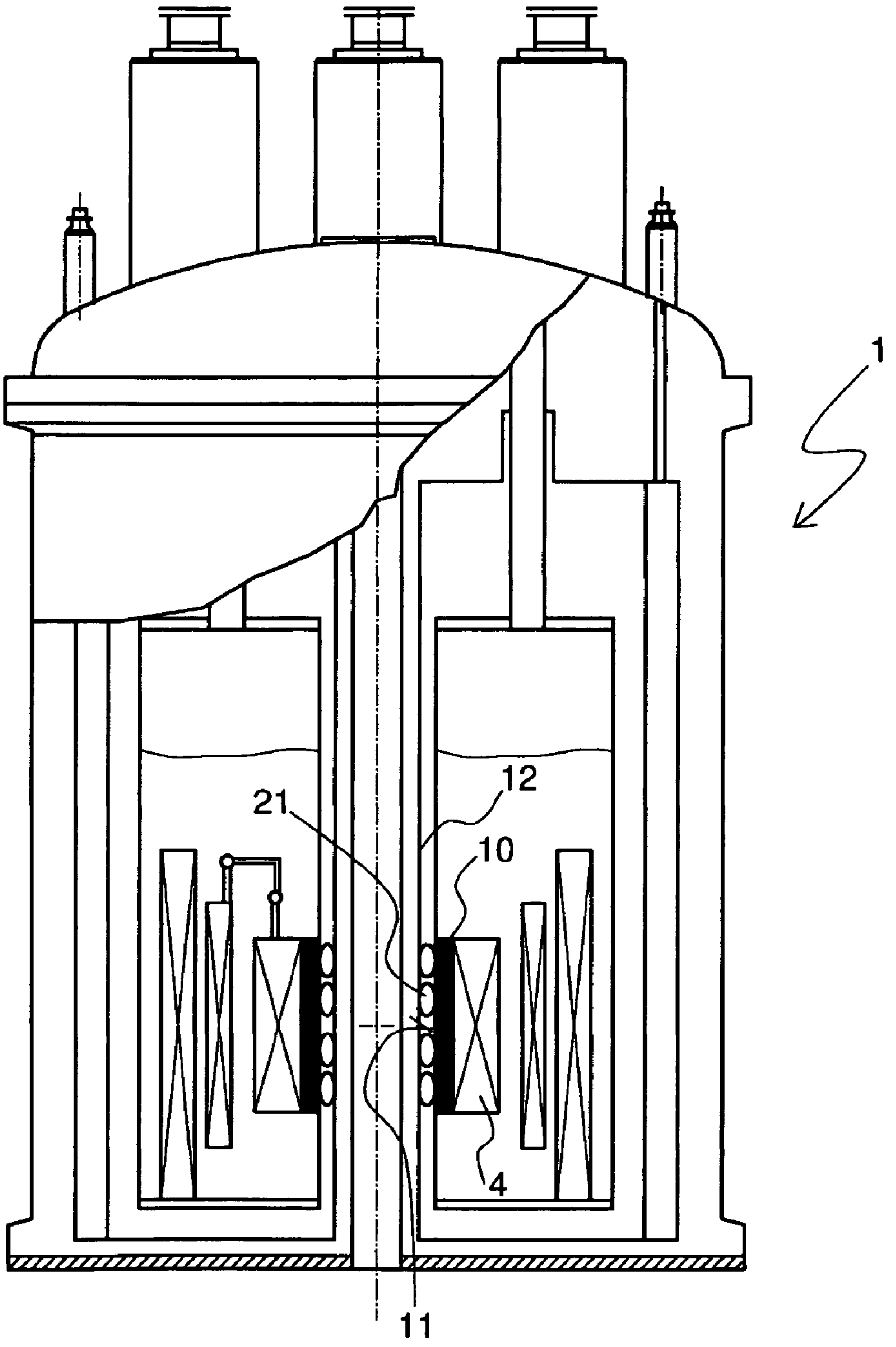
FIG. 2 is a second embodiment, similar to FIG. 1, with additional heat conducting contact springs to the radiation shield in the region of the room temperature bore.

FIG. 2 shows a slightly modified embodiment of the cryostat 1. In the event that the heat input by means of radiative heat on the wall 11 and into the thermal contact 10 is insufficient to warm the HTS section 4, contact fields 21 can be provided. These contact fields 21 connect a relatively warm portion of the cryostat 1 (warmer than $T_L$ and warmer than 2.2 K), in this case, the radiation shield 12 (with $T_S$ approximately 40 K) to the wall 11.

Figure 3:
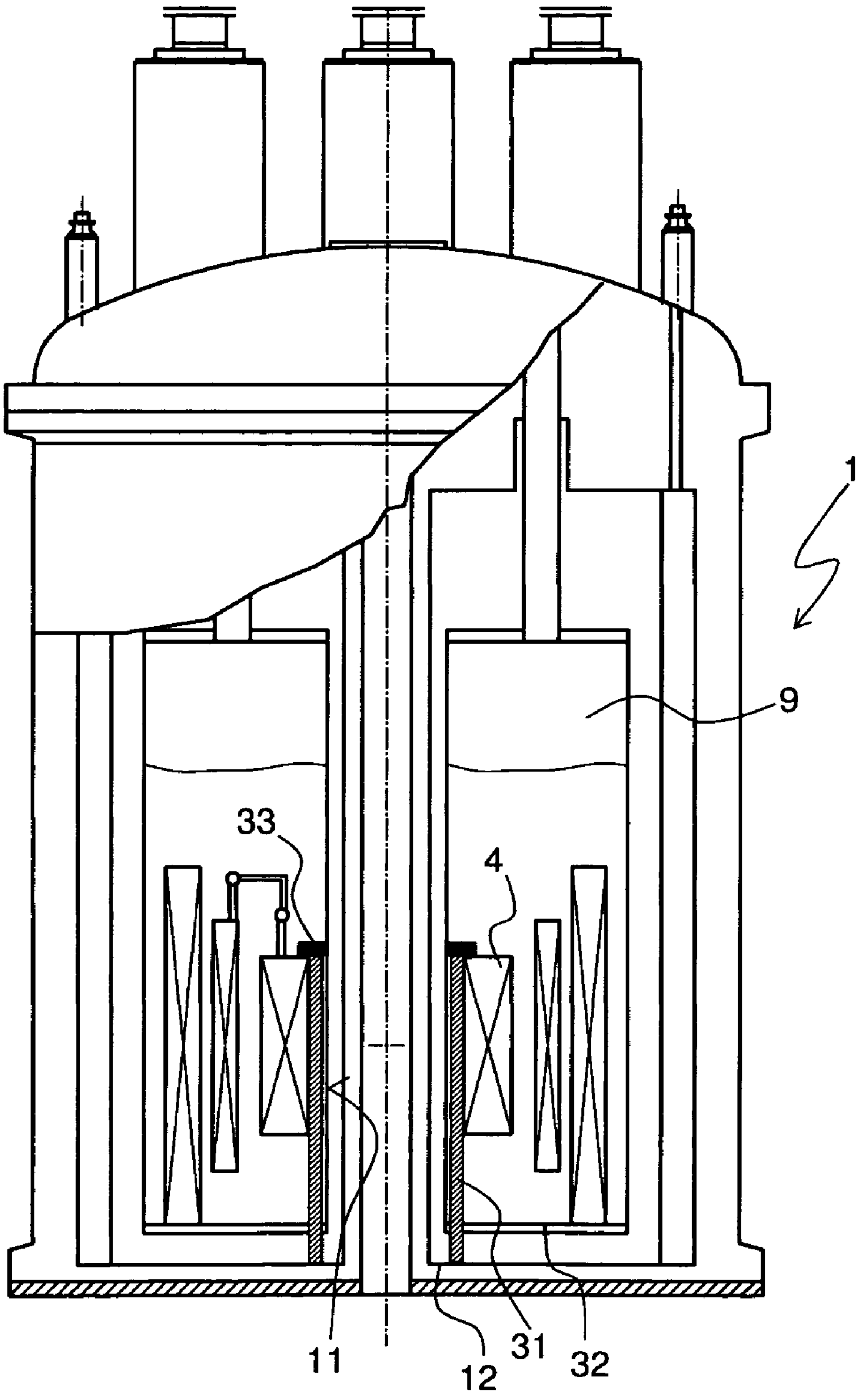
FIG. 3 is a schematic representation of a third embodiment of a cryostat in accordance with the invention having thermal contact of the HTS section to the radiation shield and the vicinity of the floor.

FIG. 3 shows a third embodiment of a cryostat 1 in accordance with the invention. The HTS section 4 is connected to another thermal contact 31. This thermal contact is fed through the floor 32 of the helium tank 9 and is connected to the radiation shield 12 at the bottom region thereof. The radiation shield 12 has a temperature $T_S$ of approximately 40 K and can therefore give enough heat into the HTS section 4 in order to prevent the penetration of superfluid into the HTS section 4. The heat input can, for example, be easily adjusted by means of the diameter of the thermal contact 31. The thermal contact 31 is preferentially thermally insulated, e.g. by means of a plastic jacket, along its entire length up to the ends.

In addition, means 33 are provided on the upper edge of the HTS section 4 to prevent helium from flowing between the thermal contact 31 and the wall 11 of the helium tank 9. Towards this end, the means 33 are ring-shaped. Alternative thereto, the function of such means can also be assumed by the thermal contact 31 itself, or the HTS section 4 is sufficiently close to the wall 11 such that no convection can occur.

Figure 4:
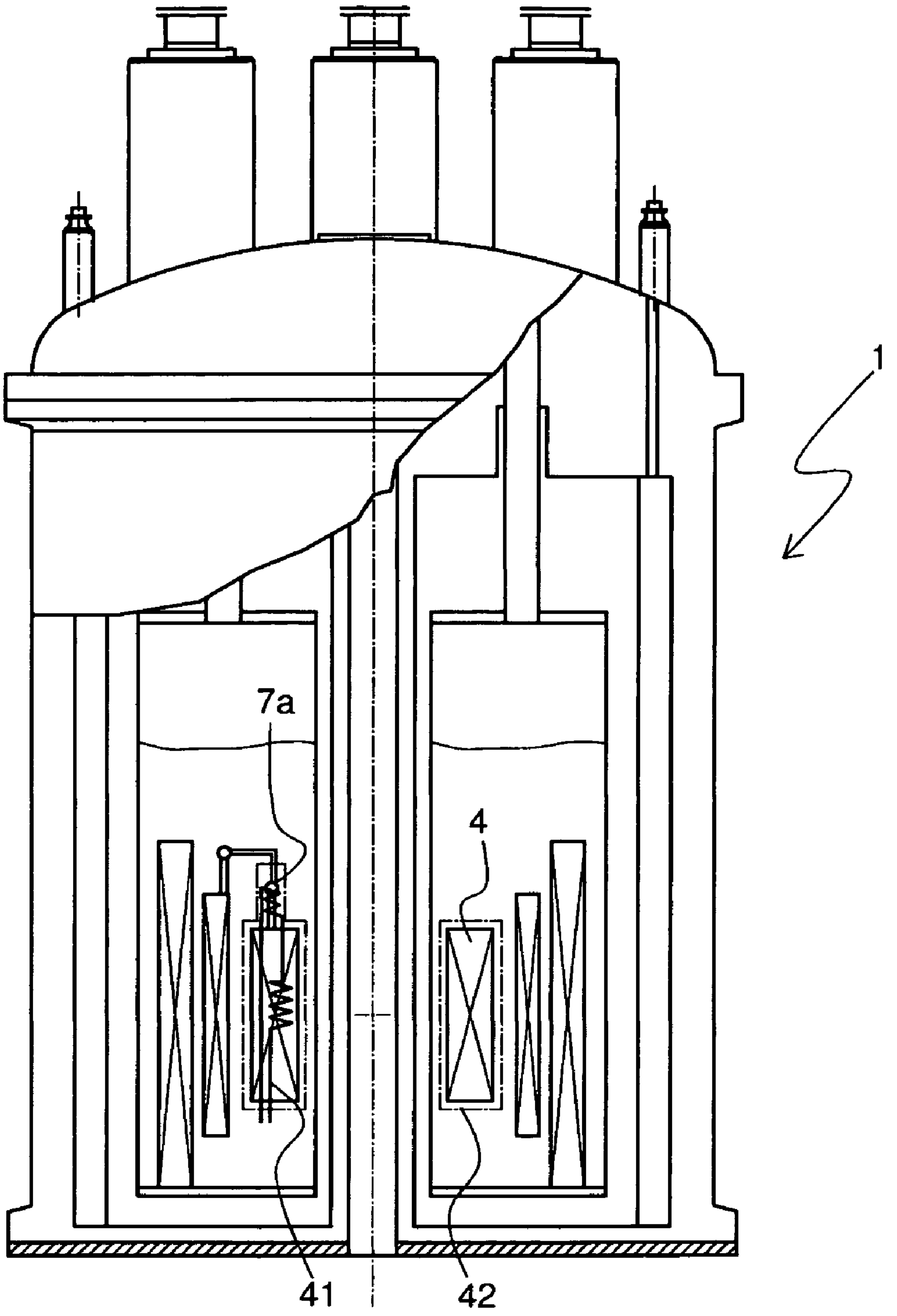
FIG. 4 shows a schematic representation of a fourth embodiment of a cryostat in accordance with the invention having an electrical heater.

FIG. 4 shows a fourth embodiment of a cryostat 1 in accordance with the invention. The HTS section 4 is not only actively heated by means of thermal contacts rather also actively heated by an electrical heater 41. Towards this end, a heating coil (made e.g. of copper) runs on the surface of or inside the HTS section 4. The heating power is adjusted in such a fashion that the desired temperature $T_H$ of the HTS section 4 results. In accordance with the invention, a temperature sensor can be provided on or in the HTS section 4 in order to monitor $T_H$. In general, a constant heating current is utilized. For simplification, the electrical leads and the current supply for the electrical heater 41 are not shown.

A jacket 42 made from a three-layer epoxy resin, which thermally insulates the HTS section 4 from the environment and also serves for mechanical separation, additionally surrounds the HTS section 4. The jacketing 42 thereby also includes the joint 7*a* so that the jacket 42 encloses all the HTS material. An additional heating coil is provided in the vicinity of the joint 7*a*.

The cryostats 1 of FIGS. 1 to 4 are preferentially parts of an NMR apparatus such as an NMR spectrometer or an NMR tomography apparatus, in particular, a high field NMR spectrometer having a magnetic field in the measuring volume $B_0$>20 T, preferentially >23 T, wherein the magnetic coil system satisfies the requirements of high resolution NMR spectroscopy with regard to the magnetic field $B_0$ homogeneity in the measuring volume and the temporal stability of $B_0$, which, in general requires that the coil sections of the magnetic coil system be operated in persistent current mode.

We claim:

1. A cryostat and magnet coil system for production of a magnet field $B_0$ in a measuring volume, the cryostat and magnet coil system comprising:

- a helium tank for holding liquid helium at a helium temperature $T_{L<}$4 K;
- an LTS solenoid-shaped coil section of a conventional low temperature superconducting (LTS) conductor disposed in said helium tank at said helium temperature $T_L$;
- at least one HTS solenoid-shaped coil section of a a high temperature superconducting (HTS) conductor, said HTS section disposed within said helium tank, said LTS and HTS sections being radially nested within another and electrically connected in series; and
- heating means communicating with said HTS conductor, said heating means disposed, structured and dimensioned to heat the HTS conductor of said HTS section to and to maintain said HTS conductor at an increased temperature $T_H > T_L$, wherein 2.2 K<$T_H$<=4.2 K.

2. The cryostat of claim 1, wherein said heating means keeps said HTS conductor at an increased temperature of $T_H$>2.5 K at all times.

3. The cryostat of claim 1, wherein said HTS section forms a radially innermost section.

4. The cryostat of claim 3, wherein the cryostat has a room temperature bore, surrounded by the magnet coil system, in which said measurement volume is located.

5. The cryostat of claim 4, wherein a thermal contact between said radially innermost section and a wall of said helium tank facing said room temperature bore constitutes said heating means, wherein said contact conveys radiative heat from said wall.

6. The cryostat of claim 1, wherein a thermal contact between said HTS section and a radiation shield functions as said heating means, wherein said radiation shield is located at a temperature $T_S$>$T_L$, where $T_S$ is approximately 40 K.

7. The cryostat of claim 1, wherein said heating means includes an electrical heater.

8. The cryostat of claim 1, wherein said HTS section or thermal contacts of said HTS section have a jacket for thermal insulation with respect to surrounding helium.

9. The cryostat of claim 8, wherein said jacket also extends to superconducting leads of said HTS section, at least to an extent that those leads contain HTS material.

10. The cryostat of claim 8, wherein said jacket is made from epoxy plastic material or from a multi-layer epoxy resin.

11. The cryostat of claim 1, wherein the magnet coil system produces a magnetic field $B_0$ in said measurement volume, which is larger than 20 T or larger than 23 T.

12. The cryostat of claim 1, wherein coil sections of the magnet coil system are operated in persistent current mode.

13. The cryostat of claim 12, wherein the magnet coil system fulfills requirements of high resolution NMR spectroscopy with regard to a homogeneity as well as a temporal stability of the magnetic field $B_0$ in the measurement volume.

14. The cryostat of claim 1, further comprising means, disposed in said helium tank, to minimize convection of helium about said HTS section.

15. The cryostat of claim 2, wherein said HTS section forms a radially innermost section.

16. The cryostat of claim 15, wherein the cryostat has a room temperature bore, surrounded by the magnet coil system, in which said measurement volume is located.

17. The cryostat of claim 16, wherein the magnet coil system produces a magnetic field $B_0$ in said measurement volume, which is larger than 20 T or larger than 23 T.

18. The cryostat of claim 17, wherein coil sections of the magnet coil system are operated in persistent current mode.

19. The cryostat of claim 18, wherein the magnet coil system fulfills requirements of high resolution NMR spectroscopy with regard to a homogeneity as well as a temporal stability of the magnetic field $B_0$ in the measurement volume.

20. The cryostat of claim 19, further comprising means, disposed in said helium tank, to minimize convection of helium about said HTS section.

* * * * *